(12) United States Patent
Ellen et al.

(10) Patent No.: US 9,489,178 B2
(45) Date of Patent: Nov. 8, 2016

(54) METHOD OF WEBSITE OPTIMISATION

(71) Applicant: MAXYMISER LTD., Edinburgh (GB)

(72) Inventors: Peter Bryan Ellen, Edinburgh (GB); Igor Volodymirovich Chub, Dnepropetrovsk (UA); Nadiya Olegivna Berestova, Zaporozhye (UA)

(*) Notice: Subject to any disclaimer, the term of this patent is extended or adjusted under 35 U.S.C. 154(b) by 0 days.

(21) Appl. No.: 14/083,747

(22) Filed: Nov. 19, 2013

(65) Prior Publication Data
US 2014/0123103 A1 May 1, 2014

Related U.S. Application Data

(63) Continuation of application No. 12/795,080, filed on Jun. 7, 2010, now Pat. No. 8,595,691.

(30) Foreign Application Priority Data

Jun. 5, 2009 (GB) .................................... 0909695.9
May 13, 2010 (GB) .................................... 1007985.3

(51) Int. Cl.
G06F 9/45 (2006.01)
G06F 9/44 (2006.01)
G06Q 30/02 (2012.01)

(52) U.S. Cl.
CPC .................. *G06F 8/30* (2013.01); *G06Q 30/02* (2013.01)

(58) Field of Classification Search
None
See application file for complete search history.

(56) References Cited

U.S. PATENT DOCUMENTS

| | | | |
|---|---|---|---|
| 5,764,241 A | 6/1998 | Elliott et al. | |
| 5,968,125 A * | 10/1999 | Garrick et al. | ............... 709/224 |
| 5,986,654 A | 11/1999 | Alexander et al. | |

(Continued)

FOREIGN PATENT DOCUMENTS

| | | |
|---|---|---|
| WO | 01/57663 A2 | 8/2001 |
| WO | 2007/076455 A2 | 7/2007 |

(Continued)

OTHER PUBLICATIONS

Javier Camara and Alfred Kobsa. 2009. Facilitating Controlled Tests of Website Design Changes Using Aspect-Oriented Software Development and Software Product Lines. In Transactions on Large-Scale Data- and Knowledge-Centered Systems I. Lecture Notes in Computer Science, vol. 5740. Springer-Verlag, Berlin, Heidelberg 116-135. 2009. DOI=10.1007/978-3-642-03722-1_5 http://itaca.gisum.uma.es/jcamara/files/2009-TLSDKCS-kobsa.pdf.

(Continued)

*Primary Examiner* — Chameli Das
(74) *Attorney, Agent, or Firm* — Precision IP (57) ABSTRACT

A website optimisation system is integrated with a website by applying generic code to the website, that being the only code needed to be applied to the native source code of the website to enable the website optimisation system to optimise the website by altering one or more of: the data, functions or content assets of web pages in the website. Integration can be achieved on a one-time basis. The generic code can be placed into a website's page template or global page header, or manually to all pages in a website. The generic code can be just a single line of code, such as JavaScript® code. The generic code remains the same irrespective of any differences in the data, functions or content assets of the web pages. The generic code includes code for all commands that enable tracking of the actions that relate to the optimisation objectives.

27 Claims, 2 Drawing Sheets

(56) References Cited

U.S. PATENT DOCUMENTS

| | | | |
|---|---|---|---|
| 6,128,651 A | 10/2000 | Cezar | |
| 6,134,304 A * | 10/2000 | Norell | 379/100.05 |
| 6,161,127 A * | 12/2000 | Cezar et al. | 709/203 |
| 6,532,463 B1 * | 3/2003 | Robbins | G06F 9/541 |
| 6,601,100 B2 | 7/2003 | Lee et al. | |
| 6,662,215 B1 * | 12/2003 | Moskowitz et al. | 709/217 |
| 6,665,658 B1 | 12/2003 | DaCosta et al. | |
| 6,697,825 B1 | 2/2004 | Underwood et al. | |
| 6,714,963 B1 | 3/2004 | Levine et al. | |
| 6,834,306 B1 | 12/2004 | Tsimelzon | |
| 6,877,025 B2 | 4/2005 | Copeland et al. | |
| 6,892,238 B2 | 5/2005 | Lee et al. | |
| 6,981,037 B1 | 12/2005 | Srikant et al. | |
| 7,188,305 B1 | 3/2007 | Corbin et al. | |
| 7,219,350 B2 * | 5/2007 | Bhogal et al. | 719/310 |
| 7,234,103 B1 | 6/2007 | Regan | |
| 7,260,774 B2 | 8/2007 | Lambert et al. | |
| 7,260,783 B1 | 8/2007 | Mika | |
| 7,353,272 B2 | 4/2008 | Robertson et al. | |
| 7,373,599 B2 | 5/2008 | McElfresh et al. | |
| 7,418,661 B2 | 8/2008 | Brandenberger | |
| 7,461,337 B2 | 12/2008 | Lection et al. | |
| 7,475,388 B2 | 1/2009 | Fong et al. | |
| 7,509,374 B2 | 3/2009 | Trinh et al. | |
| 7,543,267 B2 | 6/2009 | Lindhorst et al. | |
| 7,698,631 B1 | 4/2010 | Toebes | |
| 7,716,632 B2 * | 5/2010 | Covely, III | 717/106 |
| 7,747,604 B2 | 6/2010 | Hawkins | |
| 7,779,161 B2 | 8/2010 | Buchs et al. | |
| 7,805,337 B1 * | 9/2010 | Ogg | G06F 17/30873 705/26.1 |
| 7,818,321 B2 | 10/2010 | Hegde et al. | |
| 7,844,907 B2 | 11/2010 | Watler et al. | |
| 7,966,564 B2 | 6/2011 | Catlin et al. | |
| 8,103,742 B1 | 1/2012 | Green | |
| 8,301,720 B1 | 10/2012 | Thakker et al. | |
| 8,375,127 B1 * | 2/2013 | Lita | 709/226 |
| 8,572,559 B2 * | 10/2013 | Calvin | 717/108 |
| 8,650,076 B2 * | 2/2014 | Distefano, III | 705/14.1 |
| 8,893,294 B1 * | 11/2014 | Steele, III | G06F 17/30902 715/234 |
| 2002/0032701 A1 * | 3/2002 | Gao | G06F 17/30902 715/240 |
| 2002/0052916 A1 | 5/2002 | Kloba et al. | |
| 2002/0053078 A1 | 5/2002 | Holtz et al. | |
| 2002/0112033 A1 | 8/2002 | Doemling et al. | |
| 2002/0194342 A1 * | 12/2002 | Lu et al. | 709/227 |
| 2002/0194409 A1 * | 12/2002 | Marr et al. | 710/260 |
| 2003/0025728 A1 | 2/2003 | Ebbo et al. | |
| 2003/0135825 A1 * | 7/2003 | Gertner et al. | 715/513 |
| 2003/0167421 A1 | 9/2003 | Klemm | |
| 2003/0204386 A1 * | 10/2003 | Colon-Bonet | G06F 17/5022 703/14 |
| 2004/0133897 A1 | 7/2004 | Covely, III | |
| 2004/0148568 A1 | 7/2004 | Springer | |
| 2004/0267723 A1 | 12/2004 | Bharat | |
| 2005/0065999 A1 * | 3/2005 | Acharya | G06F 17/30902 709/203 |
| 2005/0246681 A1 * | 11/2005 | Little | G06F 8/10 717/106 |
| 2006/0015904 A1 | 1/2006 | Marcus | |
| 2006/0069611 A1 * | 3/2006 | Litt | G06Q 30/02 705/14.58 |
| 2006/0271671 A1 * | 11/2006 | Hansen | 709/224 |
| 2008/0082955 A1 * | 4/2008 | Andreessen | G06F 17/3089 717/100 |
| 2008/0140524 A1 | 6/2008 | Anand et al. | |
| 2008/0275980 A1 | 11/2008 | Hansen | |
| 2008/0294471 A1 * | 11/2008 | Gupta et al. | 705/7 |
| 2009/0024982 A1 | 1/2009 | Diep et al. | |
| 2009/0031228 A1 * | 1/2009 | Buchs et al. | 715/764 |
| 2009/0077158 A1 * | 3/2009 | Riley | G06Q 30/0277 709/202 |
| 2010/0002685 A1 | 1/2010 | Shaham et al. | |
| 2011/0271248 A1 * | 11/2011 | Simernitski | G06F 8/38 717/108 |
| 2012/0016933 A1 | 1/2012 | Day et al. | |
| 2012/0110435 A1 | 5/2012 | Green | |
| 2012/0124462 A1 * | 5/2012 | Bannoura et al. | 715/234 |
| 2012/0303607 A1 | 11/2012 | Moricz et al. | |
| 2012/0329475 A1 * | 12/2012 | Ribaudo et al. | 455/456.1 |
| 2013/0197902 A1 * | 8/2013 | Nazarian | 704/201 |
| 2013/0282691 A1 * | 10/2013 | Stouffer et al. | 707/710 |
| 2013/0290456 A1 * | 10/2013 | Weyer et al. | 709/206 |
| 2014/0236711 A1 * | 8/2014 | Lim et al. | 705/14.49 |
| 2014/0310334 A1 * | 10/2014 | Wood et al. | 709/203 |

FOREIGN PATENT DOCUMENTS

| | | |
|---|---|---|
| WO | 2008/127474 A1 | 10/2008 |
| WO | 2009/154868 A2 | 12/2009 |

OTHER PUBLICATIONS

Menon, K.; Dagli, C.H. "Web Personalization using Neuro-Fuzzy Clustering Algorithms" Fuzzy Information Processing Society, 2003. NAFIPS 2003. 22nd International Conference of the North American, Issue Date: Jul. 24-26, 2003, on pp. 525-529; Print ISBN: 0-7803-7918-7; INSPEC Accession No. 8455411; Digital Object Identifier: 10.1109/NAFIPS.2003.1226840 http://scholarsmine.mst.edu/post_prints/pdf/01226840_09007dcc8030cf6c.pdf.

Carmel Domshlak, Ronen I. Brafman, and Solomon E. Shimony. 2001. Preference-based configuration of web page content. In Proceedings of the 17th international joint conference on Artificial intelligence—vol. 2 (IJCAI'01), vol. 2. Morgan Kauffmann Publishers Inc., San Francisco, CA, USA, 1451-1456. http://citeseerx.ist.psu.edu/viewdoc/download?doi=10.1.1.30.7608&rep=rep1&type=pdf G. Castellano, A. M. Fanelli, and M. A. Torsello. 2008. Computational Intelligence techniques for Web personalization. Web Intelli. and Agent Sys. 6, 3 (Aug. 2008), 253-272. DOI=10.3233/WIA-2008-0140 http://dx.doi.org/10.3233/WIA-2004-0104 http://iospress.metapress.com/index/w295277057lu098q.pdf.

Gofman, Alex "Consumer Driven Multivariate Landing Page Optimization: Overview Issues, and Outlook" Manuscript received Feb. 15, 2007. internetjournals.net http://internetjournals.net/journals/tir/2007/July/Paper%2003.pdf.

Wei Han "Wrapper Application Generation for Semantic Web: An XWrap Approach" Thesis, Doctor of Philosophy, Georgia Institute of Technology http://www.cc.gatech.edu/projects/disl/SDM/papers/han-thesis.pdf, dated 2003.

Jose A. Macias and Pablo Castells. 2003. Dynamic web page authoring by example using ontology-based domain knowledge. In Proceedings of the 8th international conference on Intelligent user interfaces (IUI '03). ACM, New York, NY, USA, 133-140. DOI=10.1145/604045.604068 http://doi.acm.org/10.1145/604045.604068 http://citeseerx.ist.psu.edu/viewdoc/download?doi=10.1.1.1.8590&rep=rep1&type=pdf.

* cited by examiner

METHOD OF WEBSITE OPTIMISATION

CROSS REFERENCE TO RELATED APPLICATIONS

This application is a continuation of U.S. application Ser. No. 12/795,080, filed on Jun. 7, 2010, which claims the priority of British Application No. GB 0909695.9, filed Jun. 5, 2009 and British Application No. GB 1007985.3, filed May 13, 2010, the entire contents of each of which are hereby incorporated fully by reference.

BACKGROUND OF THE INVENTION

1. Field of the Invention

This invention relates to a method of website optimisation, particularly using a real-time website optimisation system.

2. Description of the Prior Art

The way in which users interact with a website is highly dependent on the exact content, layout and/or interaction sequences. Even quite small changes in for example the layout, or the graphics used, or the way content is reached, can have a dramatic impact on:

how useable the website is how long users stay reading a page how likely it is a user will progress to deeper pages within a site or select links within a page or to view or buy items.

more generally, how effectively users will interact with the site.

Consequently, it is very useful to be able to remotely modify or alter the website's content, layout and/or interaction sequences then to measure how these changes impact user behaviour. This enables the content, layout and/or interaction sequences to be optimised for clusters of users (segmentation) and or each user behaviour patterns (behavioural targeting). The phrase 'content, layout and/or interaction sequences' is generalised in this specification to the phrase 'data and/or functions and/or content assets'. The broad objective of website optimisation can be described as conversion management.

Website optimisation typically includes A/Bn, Multi-variate testing and personalization campaigns which alter the data, functions and/or content assets in a website. These alterations cause variances in visitor experiences, behavioural responses and subsequent conversion rates. Control groups are used to benchmark conversion rates for different visitor experiences; conversion rates are a metric of the number of user objectives completed divided by the number of times a specific variation of content is generated. Personalisation campaigns includes targeting, banner promotions and offers, product selections, functional navigation, form handling/processing, user experience.

Optimising a website requires a website optimisation system—typically a remote computer programmed to interact with (i.e. be integrated with) the server hosting the web pages of the website.

Previously, integration between a website using a website optimisation system has required specific JavaScript® integration between the remote computer and each individual page to be tested and altered; this is not only complex, but slow because it requires custom code for each web page, and also for each test. The custom code hard codes the specific page controls required for each page, which in turn allows the data and/or functions and/or content assets on each page to be altered and optimised. Because custom code is required for each campaign and iteration, refresh cycles govern the implementation timeframes; and restricted access rules, to organisations pre-production servers, normally block specialist external technicians access to source code. These specialist technicians often operate in separate agencies from an organisation's technical group. These factors significantly inflate the human resource requirements and the speed at which campaigns and iteration code can be deployed. Additionally any code implemented needs to be removed once a campaign is complete before another can start on the same page(s). These time and resource constraints cause a relatively high the cost of deployment and timeframes which have to be considered when management analyse the cost benefits of website optimisation programs.

"Website optimisation" as used in this specification differs from website analytics because in website analytics systems, there is no optimisation as such of the target website—i.e. there is no altering one or more of: the data, functions or content assets of web pages in the website.

SUMMARY OF THE INVENTION

The invention is a method of website optimisation, comprising the step of integrating a website optimisation system with a website by applying generic code to the website, that being the only code needed to be applied to the native source code of the website to enable the website optimisation system to optimise the website by altering one or more of: the data, functions or content assets of web pages in the website.

Typically this is one line of generic code, such as JavaScript® code, and is applied to a website's page templates, reducing the requirement to add it to individual pages.

Uniquely this implementation of the invention enables each visitor's browser application to load a controlled and changing array of assets without ongoing changes to the code contained in the website's native architecture or each page source code. Inserting a single line of JavaScript into the website's parent header or template enables the website optimisation system to integrate on a one-time basis. Once inserted on the website pages to be optimized, all the required campaigns and iterations can be deployed via the website optimisation system's console without making further changes to the website's source code or native architecture. The term 'console' is used in this specification to refer to a set of user interfaces that enable controls to be executed and data to be analysed. The console is displayed on a computer screen, so we refer to it as an 'on-screen console'.

For each web page where a unique URL is present, the system enables the mapping of identifying factors in the URL string to variations of data, functions or content assets via the system's web based console. For web pages that do not have a unique URL strings, virtual pages with assigned objects are added to the user interface with a mask in order to reproduce a virtual URL structure to identify the tested web page. These virtual pages are identified by JavaScrip® code functions that analyse and identify the page in real-time based on their unique combination of code assets. Mappings are created and managed via the systems interfaces, thereby removing the need to adjust any source code on the website.

These mappings are then delivered over a computer network to a content generator module which is able to inject the variations into web browser applications using JavaScript® calls to the source of the new data, functions or content variant assets. Changes generated by the content generator module can then be viewed by specified viewers' IP addresses or all of the websites visitors.

The content generator is able to map assets stored in its database with elements in each web page and hence work out the actual content used in a given web page and how users interact (e.g. link or click) with those assets. Matching can be done by, for example, simply labelling each object in each web page with a label that indicates the type of object it corresponds to in the content generator. Alternatively, the URL associated with each object can be associated in a separate table with a label that indicates the type of object it corresponds to in the content generator.

The present invention is implemented in a system called 'One-Touch'. One-Touch is a one-time integration that allows the execution of a program of website optimization that includes a number of campaign and their iterations. These campaigns can include many different types, such as A/Bn multivariate testing, behavioural targeting, product recommendation, segment rules and campaigns comprised of blended types and techniques. Each of these campaigns can be divided in a number of iterations in order to analyse results and make changes to attempt to improve conversion rate performance.

The effectiveness (as measured against statistical and conversion rate metrics) of various permutations of data, function and/or content assets can be established through real-time testing against control groups by the optimisation system. One time integration of a website optimisation system, which subsequently deliver a multitude of campaigns and iterations, is therefore possible, for the first time.

Another aspect of the invention is a computer implemented website optimisation system, in which the website optimisation system is operable to integrate with the website by applying generic code to the website, that generic code including all code needed to enable the website optimisation system to optimise the website by altering one or more of: the data, functions or content assets of web pages in the website.

A final aspect is computer software, when recorded on computer readable, that when running on a website optimization system enables that system to perform the methods described above.

BRIEF DESCRIPTION OF THE DRAWINGS

The invention is described with reference to the accompanying drawings, in which.

DETAILED DESCRIPTION

As explained above, this invention is a method of website optimisation: a website optimisation system is integrated with a website by applying generic code to the website, that being the only code needed to be applied to the native source code of the website to enable the website optimisation system to optimise the website by altering one or more of: the data, functions or content assets of web pages in the website. Integration can be achieved on a one-time basis.

The generic code can be placed into a website's page template or global page header, or manually to all pages in a website. The generic code can be just a single line of code, such as JavaScript® code. The generic code remains the same irrespective of any differences in the data, functions or content assets of the web pages.

The generic code includes code for all commands that enable tracking of the actions that relate to the optimisation objectives; it initiates a process for all commands that enable content replacement, tracking of the actions that relate to the optimisation objectives, tracking of personal data, and browser cookie reading & writing.

The optimisation system functions include: injecting changing data, functions and content assets into each instance of a website browser application, and executing variations on a case by case basis by replacing data, functions or content that would otherwise be delivered into visitors' browser applications by the websites standard native applications and networks. The optimisation system enables each visitor's browser to load a controlled and changing array of assets without ongoing changes to the code contained in the website's native architecture or each page's source code.

For each web page where a unique URL, or unique code is present, the optimisation system enables mapping those identifiers (i.e. the unique URL or unique code) to variations of data, functions or content assets to be inserted, in a web-based console (see below for more detail on this 'on-screen console'). For web pages that do not have a unique URL strings, virtual pages with assigned objects are added to the user interface with a mask in order to reproduce a virtual URL structure to identify the tested web page. These virtual pages are identified by code functions that analyse and identify the page in real-time based on their unique combination of code assets, mappings are created and managed via the systems interfaces, thereby removing the need to adjust any source code on the website. The mappings are then delivered over a computer network to a content generator which is able to inject the variations into web browser applications using calls to the source of the new data, functions or content variant assets. Changes generated by one or more content generators can be viewed by specified viewer IP addresses or all of a website's visitors.

The generic code links to a content generator in the website optimisation system that is able to introduce variations of data, functions or content assets. The content generator calls content to the page, executes any functions required, tracks the actions to be optimized and captures any personal data from the website.

The generic code also links to one or more on-screen consoles in the website optimisation system, the or each on-screen console showing how content on a web page is mapped by the content generator. The console enables an operator of the website optimisation system to make changes to the mappings and view changes to any of the data, functions or content assets of the website. The console recognizes the area of content on a page (or pages) into which the content generator calls content variants and the actions to be tracked and optimized, recognizes data, including personal data, that is taken from the website and enables a user to create and edit mappings of objects on the page, where a page can be uniquely identified.

A development environment provides one or more of: restrictive access to changes, quality-control and secure code changes. The development environment includes a separate content generator module which uses a secure link to manage code transfer to the content generator which executes code on live tests and campaigns.

Content assets can be stored on a distributed network of servers, such as edge servers.

The effectiveness, as measured against appropriate metrics, of various permutations of data, function and/or content assets is established through real-time testing; the real time testing measures the actions completed between control groups. This invention enables real-time website optimisation can be achieved in a conversion management system or process.

This invention is implemented in a system called One-Touch.

1. An Overview of Features and Benefits

This section describes the implementation methods and benefits of Maxymiser's One-Touch methodology. We also briefly compare One-Touch with other Maxymiser implementation methodologies.

Maxymiser's One-Touch methodology includes proprietary software, JavaScrip® technologies and services which:
  Minimize the impact of Maxymiser's solutions on current business resources;
  Guarantee enterprise-level security standards;
  Expedite objectives and throughput in Conversion Management programs;
  Deliver optimal value and ROI to Maxymiser Customers.
One-Touch is supported by the following solution components:
  Maxymiser's Publish Centre;
  Maxymiser onpage Console™;
  Content Delivery Servers via CDN;

One-Touch is the easiest, most secure and most effective way of implementing Conversion Management programs. It has been developed based on Maxymiser's un-paralleled experience of delivering full service solutions to leading online companies.

Why One-Touch is the best method available:
  It allows one-time integration based on a single, simple implementation with a website' s technical team;
  It incorporates enterprise security standards in the technology deployed and powerful management functions that mean the business retains total control;
  It minimizes page load impact using very lightweight Maxymiser "mmcore." JavaScript® code;
  It relies on a scalable global network as a backbone for high speed content delivery Some Things One-Touch Doesn't do:
  It does not interfere with site traffic using proxy-servers and other intermediary tricks which could compromise security and performance;
  It does not apply weighty code to pages that could cause slow page loads and conflicts with existing website functions;
  It does not allow code to be executed without the explicit approval of your team;
  It does not require repeated change requests to your technical team throughout the program.

For the purposes of describing the One-Touch implementation we assume that Maxymiser's Client Services team provides full test or campaign management solutions, since this is the most popular way that Maxymiser Customers engage. From an implementation perspective, this includes all steps starting with the provision of instructions on the initial one-time integration with a website at the start of an engagement; to presenting individual tests to a 'Publisher' for approval. Publishers' are Maxymiser Customers' team leaders who have exclusive rights to sign off and launch each test or campaign to a website's visitors. We are focused on technical implementation in this document so it doesn't cover the design consulting services that Maxymiser also provides.

We describe the technical work conducted by each person involved in implementation, otherwise described as a "work-group". That work group typically includes Maxymiser's Technical Client Services Team, Maxymiser's Account Management team and the designated 'Publisher'.

The benefits of one-touch methodology for people involved in implementation are substantial:
  One-Touch is a single implementation at the start of an engagement with Maxymiser;
  One-Touch uses generic code applied to all pages in a website so the application of the code is easy and quick;
  One-Touch page code can be easily applied at template level, either to a global site template or to templates within the site;
  One-Touch page code works either in the header or body of the page—whatever is most convenient;
  One-Touch Methodology and underlying technology includes high levels of security so Maxymiser Customers remain in total control over any new content that is published;
  One-Touch code sits happily on pages that are not subject to a current test or campaign with no significant impact on page load;
  One-Touch uses high-speed CDN services to host content allowing Maxymiser to meet or beat current content latency.

2. Glossary

Visitor—The Maxymiser Customers' website user.

Action—The website Visitors' action is the metric desired to be optimised in your tests to achieve higher profit. One can select the metric to optimise either from the list of metrics in the drop down box or one can create a new action by clicking on the appropriate button and setting its parameters in Maxymiser UI.

Content Generator (CG)—this is a module within Maxymiser's Conversion Management Platform which delivers content to the page, executes any functions required, tracks Actions and captures any attributes—including Personalisation Criteria such as a preference entered in a form or Action attributes such as a currency amount.

CDN (Content Delivery Network)—This is a scalable high-speed global delivery network supported by Limelight Networks Inc.

Conversion—This is a % in a given time frame of the number of click actions divided by the number of times content has been generated.

Default Content—This is the pre-existing content on a website which Maxymiser uses as a control to measure new content variant performance.

JavaScript® Libraries—These are proprietary code libraries developed by Maxymiser to manage integration into websites.

Maxybox—This is the area of content on a page (or pages) into which Maxymiser serves content variants. Maxyboxes can be simple blocks or complex combinations of content on a single or multiple pages.

Personalisation Criteria—Visitors' personal data that is taken from Maxymiser Customer's website, e.g. (name, age, gender, etc.) It can be taken from any input field on Maxymiser Customer's website by Maxymiser JavaScript® or from parameter specified in URL.

Publisher—This is a role assigned in Maxymiser's Conversion Management Platform to a person(s) in the Maxymiser Customer's team who controls the Publishing process.

3. What Javascript® Methodologies Does Maxymiser Provide:

Maxymiser deployments are founded on three JavaScript® implementation libraries. These are:

Maxymiser.js—A methodology that uses code in the page header, "div" tags around Maxyboxes, and Action tags to track each click Action that is measured. This a very simple method of JavaScript® code deployment, but each test or campaign needs new code, and may require custom code functions.

One-line methodology—A method that uses One-line of code on all pages involved in a specific test or campaign. In this methodology we have a choice of two JavaScript® libraries:

Maxymiser.js—This method uses the library files described above but these files are placed on a Maxymiser Customer's server rather than on the page. Each page requires a different One-line.

Mmcore.js—This library includes all functions required to run a test on a target website page.

One-Touch—This methodology uses a generic One-line of code which can be used on all pages for all tests or campaigns. Maxymiser's Mmcore.js opc library is deployed on a high-speed content delivery network along with any content required in a test or campaign. In One-Touch, JavaScript® functions are mapped from the library to pages using Maxymiser's onpage console™, and this avoids any replacement of code or custom script implementation between tests.

5. How a Page Loads in One-Touch Methodology

One-Touch requires only one line of Maxymiser code to be inserted on all the website pages to be including in a present or future Maxymiser Program:

<script type="text/javascript" scr="maxymiser/mmcore.js"></script>

Figure 1:
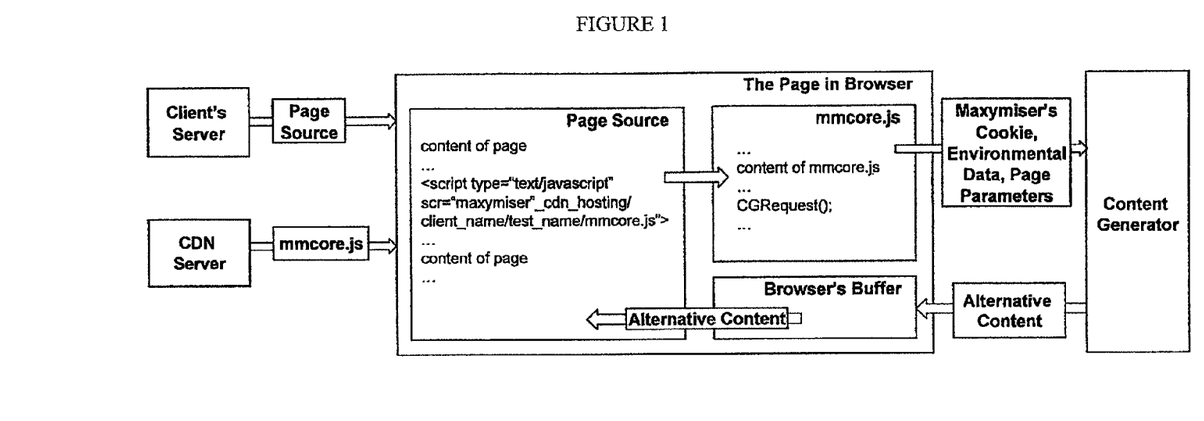
FIG. 1 depicts the Content Replacement Workflow schema of an implementation of the invention.

The FIG. 1 diagram explains the interaction in One-Touch between the components of Maxymiser's One-Touch solution, the Visitor's browser and the website server.

Figure 2:
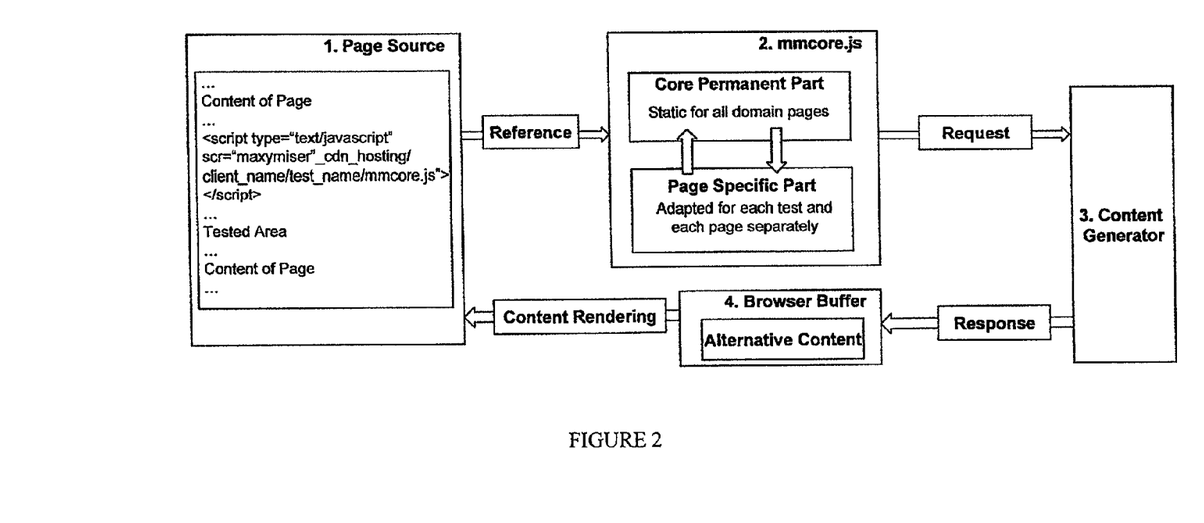
FIG. 2 depicts the page load schema.

In One-Touch methodology, the codes that perform content replacement are included into the mmcore.js OPC library which lives on the CDN. When a page is loaded to a visitor's browser, the functions required from mmcore.js OPC libraries are executed along with the source code of the page and processed command-by-command as the page loads, as shown in Figure.

The content of mmcore.js is conventionally divided into two parts:

The Core Permanent part—this part is generic for all pages of the domain. The Core Permanent part is configured for a domain only once before the first test setup and is not changed after that. The Core Permanent part contains standard commands of content replacement, Actions & Personalisation Criteria tracking, browser cookie reading & writing and so on.

The Page Specific part—this part is adjusted for the pages of each test individually. The Page Specific part contains configurations for standard commands. With the help of this part, Maxymiser can customise the execution of the Core Permanent part commands as required for certain page content, test and general requirements. For example, Maxymiser can specify which Maxybox should be rendered on the test page first, or in which browsers the test should be conducted. Note: In the One-Touch solution this part is usually absent. Page Specific code is rarely used.

The Page Specific part uses the Core Permanent part when commands are executed.

6. A Comparison of One-Touch vs. other Maxymiser Javascript® Solutions

Maxymiser's One-line Solution works with a JavaScript® library called Mmcore.js. One-Touch uses a more advanced JavaScript library mmcore.js OPC library which works with Maxymiser's OPC onpage Console™.

How the Libraries Differ:

Mmcore.js One-Line solution:

The Page Specific part of mmcore.js contains i. All commands that enable content replacement and action-tracking functions such as:

Define Maxybox and Action names on a test page

Hide default content of Maxyboxes

Show alternative content

Track Actions and Personalization Criteria ii. Configuration of the code itself.

One-Touch Solution [mmcore.js/opc]:

The One-Touch solution is implemented in a more flexible way that allows:

i. The transfer of Maxyboxes to a page via mapping rules, created in OPC or the Maxymiser UI;

ii. The transfer of Actions from a page to Maxymiser UI;

iii. The execution of functions like hiding default content and rendering alternative content, tracking Actions and Personalization Criteria by scripts that are sent to the browser from the Content Generator as a request response.

Hence, the Page Specific part of mmcore.js/opc contains only: the request to the CG—i.e. mmcore.CGRequest( ); command;

All other commands and configuration options called "configuration scripts" are stored in the Maxymiser database as/OPC after a response is received from the CG.

The mmcore One-line solution requires greater effort from Maxymiser team than the One-Touch solution, as it requires the customizing of mmcore.js script for each separate page whereas in the One-Touch solution, mmcore.js is configured once for all pages.

7. Exceptions for the Use of the One-Touch Solution

One-Touch works without customization for the vast majority of websites, WCMS's and web application platforms since Maxymiser requires a very shallow level of integration which is not linked to any software. Maxymiser's team provide a website audit prior to implementation of One-Touch code to indentify any special requirements.

The two most common situations when the One-Touch requires either customization or a composite solution from Maxymiser's team are:

When the tested page has "APPLICATION/XHTML+XML" MIME media type.

In the case the tested website has "APPLICATION/XHTML+XML" MIME media type in the header of the server response, certain commands of mmcore.js script cannot be executed by the browser (document.write method does not work for such pages).

One-Touch integration is not possible in this case but the One-line integration methodology using maxymiser.js provides a good alternative approach.

The URLs of pages on the website are not unique for each page.

In this case, out-of-the-box URL mapping is not possible using onpage console but Maxymiser regularly uses alternative methods to get around the problem.

If website pages have unique identifiers that are stored in any object like a JS variable, an ID of some element on the page, or a page specific cookie, then Maxymiser can use this ID for page mapping to achieve One-Touch integration.

Flash Testing

Maxymiser has some restrictions regarding flash testing with .xml files hosted via a CDN. In the case of flash content tested we recommend testing complete content blocks. Partial changes in flash content are not currently possible.

How Maxymiser uses Page ID's:

i. The Maxymiser Customer's technical team can make backend modifications so the site is able to assign this unique identifier of the page to a window.mmPageID variable before loading the mmcore.js library.

Or ii. Mmcore.js can be customised by Maxymiser team and resent back to a Maxymiser Customer. While loading mmcore.js will recognize this variable and pass it to the Content Generator instead of page URL for mapping purposes. In these cases masks used in mapping definitions in Maxymiser's Maxymiser UI have to match the values of variable window.mmPageID.

8. One-Touch Integration Code Types and where they Reside

The following code type is required in One-Touch integration:

One-Touch page code—this is the code that resides on all pages—see example below:

<script type="text/javascript" scr="maxymiser/mmcore.js"></script>

Code types that reside on the Content Delivery Network:

Mmcore.js/opc library—this is the main library that performs key operations, like content replacement, Action tracking and so on. It resides on the high-speed CDN.

Supplementary libraries—JavaScript® libraries used for the execution of Maxymiser functions, including:
  mmevents.js library for special Action tracking
  mmpa.js library for content assist functionality support
  mmcore-attrs.js for segmentation custom criteria tracking
  mmcore.DOM.js library that simplifies work with DOM model Content of page—HTML content of alternative variants, CSS files and JavaScript® code used in alternative variants;

External resources of page—i.e. images, flash and other resources used in alternative content;

Configuration scripts—These are custom JS code functions used to adjust the main and supplementary libraries to particular website peculiarities or requirements. The main purposes of these scripts are:
  Update settings of mmcore.js library on the fly (for example to exclude browsers or filter from pages)
  Activate and configure supplementary libraries (mmevents.js, mmpa.js and so on)
  Any additional configuration of any custom library created for specific test case.

9. Securing Code Interactions

Information security is a key tenant of Maxymiser and underpins the premium credentials of Maxymiser's solutions.

A summary of Maxymiser standard security measures:
  Maxymiser's Information Security Policy is based on the ISO27001 standard;
  Maxymiser's data centers hold ISO27001 certification, and are subject to annual audits to maintain this status. They also receive periodic audits by Maxymiser Customers' information security officers, including those of major financial services institutions;
  Maxymiser development methodologies are subject to periodic external audits, most recently passing a Symantec audit in 2008;
  Content generator communications with a Maxymiser Customer's server and Content Delivery Network utilize:
    HTTPS connections
    SSL certification
    128-bit Encryption 10. Maxymiser Publish Centre Maxymiser's Publish Centre fulfils three key objectives which support Maxymiser's One-Touch methodology:
  To quality-control and secure Maxymiser code changes;
  To assign control of these releases to a Publisher;
  To provide effective workflow in the preparation of changes.

10.1 Quality Control and Secure Code Change Management

Figure 3:
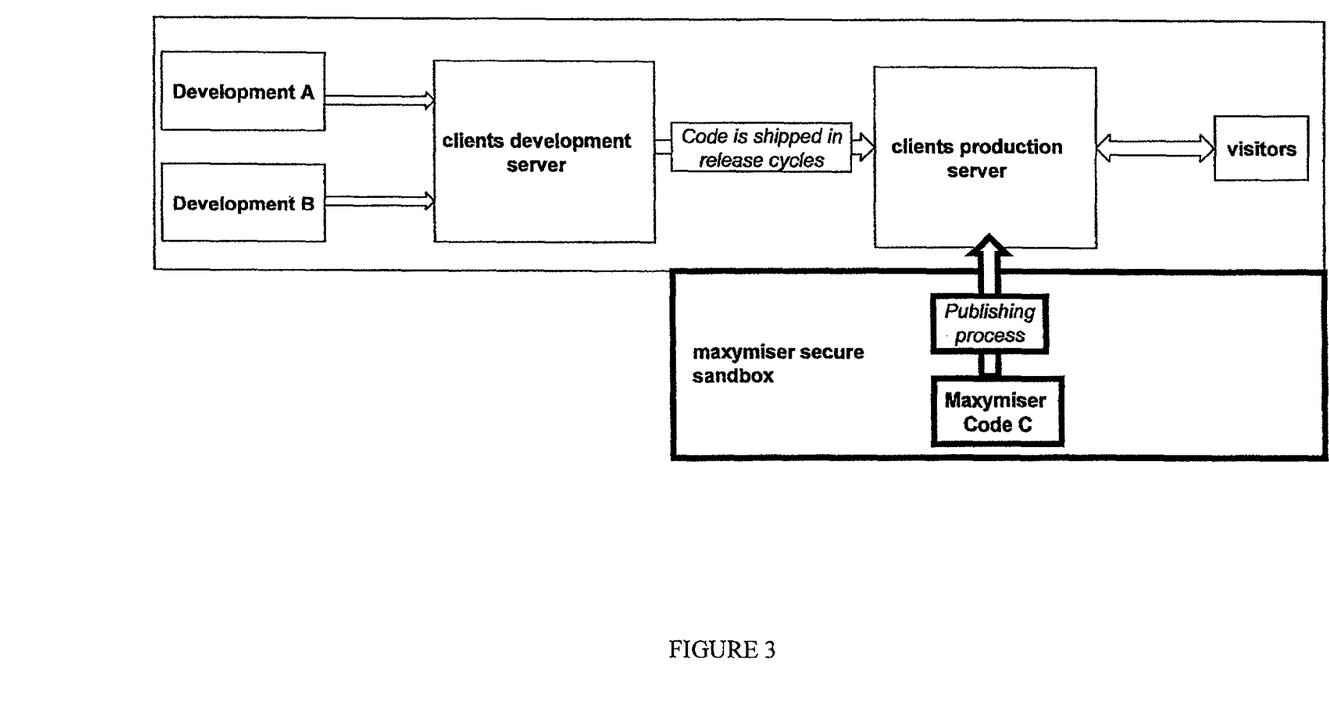
FIG. 3 depicts the Publish Centre, which includes a physically and logically discrete Sandbox development environment.

Maxymiser's Publish Centre includes a physically and logically discrete Sandbox development environment. The Sandbox has a separate Content Generator module which uses a secured VPN linked to manage code transfer to the Content Generator which executes code on live tests and campaigns, as shown in FIG. 3.

To view the Sandbox code (which is the pre-production version of tests or campaigns) Maxymiser Users shall meet each and all of the following criteria:
  They require to be authenticated users of Maxymiser's Conversion Management Platform;
  They must have appropriately assigned rights within Maxymiser's role module;
  They must use Maxymiser System from a controlled IP list defined for each domain;
  They must hold a special cookie in their browser which binds them to the points above.

The publishing process is solely controlled and executed by a Publisher who has a unique role for each domain at the start of Maxymiser's engagement. For each request to publish the Publisher is provided with details of the changes made to the Sandbox and can use onpage console to preview the Sandbox version of the pages.

11. Overview of Maxymiser'S Onpage Console™

Onpage Console™ (OPC) provides the capability for technicians to manage website JavaScript® integration using One-Touch methodology. It is also useful for Publishers to view changes. Instructions to install OPC are provided upon engagement with Maxymiser and the OPC includes a full online help guide. A 'console' as that term is used in this specification is a set of user interfaces that enable controls to be executed and data to be analysed. The Onpage console is displayed on the screen, so we refer to it as an on-screen console.

OPC is a browser plug-in based on Microsoft Silverlight technology that shares Maxymiser User authentication with Maxymiser's main platform and mirrors test set-ups. Once the plug-in is installed, Maxymiser Users who comply with the Maxymiser team security requirements stated in section 10.1 will see the OPC icon on the right hand side of their screen when browsing pages which contain Maxymiser one-touch script.

12. Placing a Maxybox on a Page

Maxyboxes can be placed in the correct position on a page using various methods as mentioned below:
  If the page has pre-existing short unique line identifiers, these can be adopted as Maxybox names in test set up and Maxymiser' s Content Generator will automatically look for these on the page and insert content in the appropriate places.
  If the line identifier is too long to adopt as a Maxybox name (as in some .asp pages) Maxymiser team can use OPC to inject a translation script into the page which translates the line ID to a usable ID which in turn is adopted as a Maxybox name.

If no line ID's exist Maxymiser team can use OPC to inject a custom script to identify lines in the page code.

In a page without line ID's Maxymiser's team can include JavaScript® in the content variant which tells the CG where to insert the content on the page.

Each of the above solutions can have code libraries which can be augmented and refined to address an increasing number of page-build scenarios.

13. One-Touch Content Delivery Network

In section 3 we identified the types of code required in Maxymiser's One-Touch methodology. Maxymiser's One-Touch is supported by a global leader in high-speed content delivery that enables all the content assets required in One-Touch to be stored on a global network of edge servers, reducing the distance between Visitors and website content that needs to be delivered. In the event that those content assets are being delivered for the first time, a private optical network short cuts the logjams incurred in the public Internet over longer distances.

Maxymiser's team manage these assets on a secure origin server and all changes in content or code execution are controlled through Maxymiser secure Publishing process. Maxymiser CDN services support Maxymiser's standard security provisions including HTTPs, SSL and 128-bit encryption.

What CDN contributes to One-Touch:
- Content Assets are delivered across high speed networks that often out-pace a websites standard latency.
- Maxymiser's team can prepare and monitor quality control of these assets for Publisher approval processes.
- A website's current infrastructure load will be reduced as Maxymiser provides CDN services for the replacement content.
- Content managed under One-Touch can be delivered globally at low latency, assisting with any website scalability.

14. Conclusions

Maxymiser One-Touch provides a highly effective way to execute Conversion Management Programs, with high levels of security and full life cycle solutions support. The net result is faster and higher ROI for Maxymiser's Customer, with minimal impact on already busy technical teams.

Appendix 1 is an overview of the entire website optimisation process and system that the One-Touch deployment forms a part of.

Appendix 2 is a description of the website personalization features of this system.

Appendix 3 is a description of the algorithms deployed in this process and system.

Appendix 1
Overview of the Complete Website Optimisation System and Process

Maxymiser's proprietary conversion management methodologies deliver continuous conversion uplift in every major online vertical including retail, finance, travel, media, gaming, social media and charity sectors. The benefits brought to online businesses include:
- Continuous uplift in conversion rates and revenues
- Expertise and full-service solutions to manage entire programs
- OneTouch deployment ensuring minimal tech team involvement and no dependence on website code release cycles
- Real-time visitor and customer insight
- Negates need for costly website re-designs and the risks they bring
- Increased response rates to cross-sell and up-sell promotional offers by offering the optimal offer to each individual visitor
- Increased revenue and cart sizes through personalized product and category recommendations through the visitor journey
- Multichannel integration to increase relevance of offers and campaign conversion rates across all touch points A/B . . . n and multivariate testing brings objectivity to your content design: Maxymiser A/B . . . n and multivariate testing optimizes website content based on live visitor feedback. Maxymiser concludes which content produces the best conversions using live control groups, statistical analysis and real-time reports. Conversion metrics include sales, sign-ups, page impressions and any click that your web site monetizes. Your customers benefit from user experience improvements based on statistically proven analysis. Your business benefits from continuous uplift in conversion rates.

Visitor segment targeting works on the basis that content which is 'winner for all traffic' can be further optimized by targeting specific visitor segments with specific content based on a range of visitor attributes available online though our platform. The segments can be defined by rules in an intuitive rule engine or you can leave Maxymiser to automatically mine the optimal visitor segments and the winning content for each group. Our reporting provide critical visitor and customer insight to support development of your strategic marketing plans.

Maxymiser creates personalized cross-selling and up-selling campaigns on websites to increase response rates, revenues and cart sizes. These include automated product and category recommendations and automated cross-sell and up-sell promotional campaigns. We have the broadest range of integrated modeling techniques available from one integrated platform ensuring we can deploy the optimal modeling for each situation to maximize ROI and minimize Total Cost of Ownership. Real-time testing, trend reports and inventory analysis support campaigns and provide customer insight.

Maxymiser enables anonymous customer data from all channels to be exploited when personalizing web sites. Our proprietary Inline Database enables all offline data held in CRM systems to be stored and exploited in targeting decisions at web-speed. The benefits are:
- Conversion rates and response rates are increased using powerful offline and CRM data
- Enterprise CRM data is enriched with highly predictive online behavioural data
- Customer experience can be effectively integrated across channels Maxymiser's proprietary SaaS platform enables clients and our service teams to manage conversion dynamically, running multiple website tests and targeting campaigns at the same time. Progression from one solution to the next is simple and data is shared between all solutions. Our best-in-class Report Centre is available in real-time, 24/7 and provides snapshot and deep-dive views on conversion metrics along with customer insight.

Maxymiser has the easiest to integrate website marketing software available. Our OneTouch deployment methodology makes it easy to integrate with any website in hours on a one-time-for-all-future-test basis. That means marketers can focus on actioning conversion management free from technical queues and resource restrictions.

Appendix 2
Website Personalisation—Solutions Overview

Personalization has been on online marketers' wish lists for years. As experienced direct marketers will testify, it is capable of delivering significantly higher sustainable engagement and response rates than segment targeting. However, to date its use online has been hampered by high Total Cost of Ownership (TCO) and targeting decision speeds designed for call centre applications with unacceptably slow page load times online.

Maxymiser's personalization solution marks a new beginning. It enables 'vanilla' web sites to far more effectively engage and re-engage both visitors and customers with both promotions and recommendations based on their individual:
 Environmental attributes: IP address, PC configuration, browser type
 Contextual attributes: time of visit, referring URL, traffic source, keyword, affiliate
 Detailed past browsing history: what they viewed at in past, when and in what order
 Where available CRM data Maxymiser analyses this data in real-time using a broad range of advanced self-learning models to enable you to serve the most:
 Enticing up-sell or cross-sell promotion on banners or other key content areas to maximize response rates and drive each customer's personalized experience
 Engaging product or category recommendations at any stage in the customer journey to increase the yield of key areas of site real estate, revenues and average cart size Personalization can drive great uplift in response rates but it operates best within the context of a website optimized by concurrent MVT test programs. Increased response rates to offers and recommendations are not efficiently exploited if the key high volume web pages and conversion funnels are not also being optimized using MVT testing. Maxymiser's personalization is rigorously judged against transparent uplift metrics within a 'test and improve' framework ensuring a strong ROI.

The benefits include the following:
 Drive increased response rates to onsite offers and promotions by automatically targeting the right offer to each individual visitor. The offer most likely to elicit a response from each visitor is determined on an individual basis and displayed.
 Automatically create engaging, targeted product and category-level recommendation blocks to boost revenues and cart sizes. Typical recommendation blocks include: "Highest rated"; "Customers like you also looked at:" (exploiting visitor affinity targeting) and "Similar hotels nearby: (exploiting product affinity targeting)
Unique Benefits of Maxymiser's Personalization Solutions
 Ability to exploit the most relevant modeling techniques (behavioral response modeling or affinity modeling) for each campaign for maximum conversion uplift and ROI
 Personalize entire websites from a single platform dramatically reducing TCO and management overhead and maximizing the yield of each area of site real estate
 Ensure customers are targeted consistently and using all known data about them regardless of device they are using at that point (home PC, work PC, smartphone . . . )
 Deliver personalization within a proven 'test and improve' framework to ensure sustainable uplift and identification of strong and weak creative content
 Integrate within days using class-leading OneTouch methodology
 Real-time reporting with transparent ROI and deep insight at campaign level World-class global SaaS architecture enables rapid integration with existing infrastructure with proven robustness, security and performance Solution Components
 Content ASSIST: Generates product recommendations at product or category level based on the most advanced visitor and product affinity modeling on the market
 Content BT: Presents targeted promotional offers using automated, self-learning behavioral response models based on online and offline CRM data
 Integration: Deployed via Maxymiser's class-leading OneTouch integration using one small, generic piece of JavaScript® applied once to all pages with no further required from client's technical teams for all future campaigns
 Client Services: Our industry-leading team of experts will guide and support you to achieve your personalization ambitions grounded in the delivery of a transparent ROI. Services include Usability, Data Analysis, Creative Design, Web Development, Project Management and Technical Support.

Appendix 3
Campaign Optimization Method
Introduction

Maxymiser Conversion Management platform provides various types website optimization campaigns to objectively test, improve and personalize a website's visitor and customer experiences. Campaign types are designed to meet the requirements of different kinds of content to be optimized, the structure of content variants which need to be served and reported; and the action metrics to be targeted. Campaign methods are the maths approaches used in one or more campaign type. Campaign methods are mathematical approaches, including self-learning algorithms, which determine the exact variants of content to be served to a website visitor.

Full Factorial/Random Serve Method

This method delivers a statistically valid distribution of generations of content variations by serving content on a random basis. Overtime the generation instances of each content variation will be similar across any given group of visitors. This method is commonly, but not exclusively, used in A/B . . . n and Multivariate testing.

Continuous Optimisation Method

Maxymiser's Continuous Optimisation method works by modelling a response variable (target conversion metric) in terms of covariates (uncontrolled variables which influence the response, which are visitors' attributes or content generation time), factors (controlled variables which are content variations being delivered to visitors), and interactions between them. Dependent on account settings in Maxymiser's software this method may only model content generations and actions; or in higher level account settings it will factor in a large array of visitor attributes. Visitor attributes include environmental factors, visitor behavioural factors and offline visitor intelligence data which might influence the response of a visitor to particular content and experiences. This is often referred to as behavioural targeting. Continuous Optimization uses self-learning algorithms and determines which variations of content should be shown to each visitor. Logistic regression modelling with automated relevance determination is used to model the response variable in terms of covariates, factors and interactions. This makes it possible to accurately model the target conversion rate, to protect the model from overfitting and to avoid spurious factors and interactions which do not actually manifest themselves in the data, and to take into account the possible differences of conversion rates through the time.

Taguchi Method

Taguchi design of experiments methodology can be used to study the influence of various factors conversion performance and determine which factor has more influence, which ones have less. It's practical uses limit the number of content variant combinations in a campaign within a given visitor group so as to expedite conclusive results, supported by statistical confidence metrics.

The Taguchi method proposes a restricted array of combinations in specially selected arrays from so called Taguchi arrays. Instead of having to test all possible combinations, the Taguchi method allows Maxymiser to test specific groups of them. This allows Maxymiser to collect the necessary data to determine which parameters most affect the uplift with a minimum amount of experimentation, thus saving time. The Taguchi method is best used when there is an intermediate number of content elements (3 to 10), few interactions between elements and when only a few elements contribute significantly.

The Taguchi method used by Maxymiser allows for the analysis of many different elements of content but with lower traffic volume. For example, a process with 8 elements, each having 3 Variants, would require 6561 (38) experiments to test all possible content combinations. However using Taguchi's orthogonal arrays, only 18 tests are necessary, or less than 3%. This allows for the identification of key content elements and variants. Elements that have the most effect on the web site's performance value can be served whilst those that don't can be ignored.

Collaborative Filtration

This method is typically used to generate recommendations from large inventories, like product inventories on retail websites, or article inventories on media sites. Collaborative filtering in Maxymiser utilizes a combination of two different collaborative filtering techniques to generate recommended content—Visitor-based and Item-based.

For example if visitor adds a product to basket, an item-based recommendation approach can offer complementary products to develop cross-sales revenue. In the Visitor-based approach the visitor can see the selection of other visitors or buyers with similar interests. Collaborative Filtering has two active phases, the learning phase and generating phase. In Maxymiser's architecture there are two modules, the off-line module (learning phase) and on-line module (generating phase) processing all recommendations requests. The off-line module performs full calculations for both modes (visitor-mode, item-mode) and builds the model of visitor- and item-based recommendations. On-line module uses this data for generating recommendations. Both modules are synchronized automatically and work in a continuous cycle or learning phase and generation.

Segmentation

Maxymiser enables segmentation of traffic to be conducted to create flexible business rules. These rules identify the attributes of criteria that a visitor should posses to qualify for inclusion, and a proscribed set of content variation that qualifying visitors should be served. Segment rules work by segmenting visitors at the point of content generation based on an "and" logic where a visitor should comply with all the attribute conditions in order to qualify for inclusion in the rule which in turn determines the content to be shown. Maxymiser provides manual and automatic data mining and modeling to support the software users creation and maintenance of segment rules.

The invention claimed is:

1. A method comprising:
receiving a request for a webpage corresponding to a Uniform Resource Locator (URL);
identifying the webpage corresponding to the URL;
identifying a reference, associated with the webpage, to code external to the webpage;
executing the code to perform:
mapping the URL to at least one variation of data, functions, or content assets of the webpage;
injecting the at least one variation of data, functions, or content assets into a copy of the webpage to generate an optimized webpage without modifying said webpage;
responsive at least to receiving the request for the webpage corresponding to the URL, transmitting the optimized webpage with the at least one injected variation;
wherein the method is executed by at least one device including a hardware processor.

2. The method of claim 1, wherein the reference, associated with the webpage, is identified in response to the reference being stored in association with a website corresponding to the webpage.

3. The method of claim 1, wherein the reference, associated with the webpage, is identified in response to the reference being stored in association with a website page template corresponding to the webpage.

4. The method of claim 1, wherein the identifying, executing, and transmitting operations are performed by a web server.

5. The method of claim 1, wherein the identifying and executing operations are performed by a web server responsive at least to receiving the request for the webpage.

6. The method of claim 1, wherein the reference, associated with the webpage, is comprised within one line of generic code within the webpage.

7. The method of claim 1, wherein the injecting operation is performed by a web browser application that transmits the optimized webpage for display on a display device.

8. The method of claim 1, wherein the at least one variation of data, functions, or content assets is determined based on a requestor of the webpage, and wherein the operations further comprise generating different variations of the webpage for different requestors.

9. The method of claim 1, wherein the operations further comprise: transmitting information for display on an on-screen console, the information identifying the differences between (a) said webpage and (b) the optimized webpage.

10. A non-transitory computer readable medium comprising instructions which, when executed by one or more hardware processors, causes performance of operations comprising:
receiving a request for a webpage corresponding to a Uniform Resource Locator (URL);
identifying the webpage corresponding to the URL;
identifying a reference, associated with the webpage, to code external to the webpage;
executing the code to perform:
mapping the URL to at least one variation of data, functions, or content assets of the webpage;

injecting the at least one variation of data, functions, or content assets into a copy of the webpage to generate an optimized webpage without modifying said webpage;

responsive at least to receiving the request for the webpage corresponding to the URL, transmitting the optimized webpage with the at least one injected variation.

11. The medium of claim 10, wherein the reference, associated with the webpage, is identified in response to the reference being stored in association with a website corresponding to the webpage.

12. The medium of claim 10, wherein the reference, associated with the webpage, is identified in response to the reference being stored in association with a website page template corresponding to the webpage.

13. The medium of claim 10, wherein the identifying, executing, and transmitting operations are performed by a web server.

14. The medium of claim 10, wherein the identifying and executing operations are performed by a web server responsive at least to receiving the request for the webpage.

15. The medium of claim 10, wherein the reference, associated with the webpage, is comprised within one line of generic code within the webpage.

16. The medium of claim 10, wherein the injecting operation is performed by a web browser application that transmits the optimized webpage for display on a display device.

17. The medium of claim 10, wherein the at least one variation of data, functions, or content assets is determined based on a requestor of the webpage, and wherein the operations further comprise generating different variations of the webpage for different requestors.

18. The medium of claim 10, wherein the operations further comprise: transmitting information for display on an on-screen console, the information identifying the differences between (a) said webpage and (b) the optimized webpage.

19. A system comprising:
at least one device including a hardware processor;
the system being configured to perform operations comprising:
receiving a request for a webpage corresponding to a Uniform Resource Locator (URL);
identifying the webpage corresponding to the URL;
identifying a reference, associated with the webpage, to code external to the webpage;
executing the code to perform:
mapping the URL to at least one variation of data, functions, or content assets of the webpage;
injecting the at least one variation of data, functions, or content assets into a copy of the webpage to generate an optimized webpage without modifying said webpage;
responsive at least to receiving the request for the webpage corresponding to the URL, transmitting the optimized webpage with the at least one injected variation.

20. The system of claim 19, wherein the reference, associated with the webpage, is identified in response to the reference being stored in association with a website corresponding to the webpage.

21. The system of claim 19, wherein the reference, associated with the webpage, is identified in response to the reference being stored in association with a website page template corresponding to the webpage.

22. The system of claim 19, wherein the identifying, executing, and transmitting operations are performed by a web server.

23. The system of claim 19, wherein the identifying and executing operations are performed by a web server responsive at least to receiving the request for the webpage.

24. The system of claim 19, wherein the reference, associated with the webpage, is comprised within one line of generic code within the webpage.

25. The system of claim 19, wherein the injecting operation is performed by a web browser application that transmits the optimized webpage for display on a display device.

26. The system of claim 19, wherein the at least one variation of data, functions, or content assets is determined based on a requestor of the webpage, and wherein the operations further comprise generating different variations of the webpage for different requestors.

27. The system of claim 19, wherein the operations further comprise: transmitting information for display on an on-screen console, the information identifying the differences between (a) said webpage and (b) the optimized webpage.

* * * * *

UNITED STATES PATENT AND TRADEMARK OFFICE
CERTIFICATE OF CORRECTION

| | |
|---|---|
| PATENT NO. | : 9,489,178 B2 |
| APPLICATION NO. | : 14/083747 |
| DATED | : November 8, 2016 |
| INVENTOR(S) | : Peter Bryan Ellen, Igor Volodymirovich Chub and Nadiya Olegivna Berestova |

It is certified that error appears in the above-identified patent and that said Letters Patent is hereby corrected as shown below:

On the Title Page

Item (73) Assignee is missing. Please add this item to be:
(73) Assignee: MAXYMISER LTD. Edinburg (GB)

Signed and Sealed this
Seventeenth Day of March, 2020

Andrei Iancu
*Director of the United States Patent and Trademark Office*